(12) United States Patent
Wang et al.

(10) Patent No.: US 11,564,216 B2
(45) Date of Patent: Jan. 24, 2023

(54) INFORMATION TRANSMISSION METHOD AND DEVICE

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 105 days.

(21) Appl. No.: 16/610,520

(22) PCT Filed: Apr. 3, 2018

(86) PCT No.: PCT/CN2018/081760
§ 371 (c)(1),
(2) Date: Nov. 4, 2019

(87) PCT Pub. No.: WO2018/201840
PCT Pub. Date: Nov. 8, 2018

(65) Prior Publication Data
US 2020/0154408 A1 May 14, 2020

(30) Foreign Application Priority Data

May 4, 2017 (CN) .......................... 201710309717.8
Mar. 28, 2018 (CN) .......................... 201810282225.9

(51) Int. Cl.
*H04W 72/04* (2009.01)
*H04L 5/00* (2006.01)
*H04W 72/12* (2009.01)

(52) U.S. Cl.
CPC .......... *H04W 72/042* (2013.01); *H04L 5/001* (2013.01); *H04L 5/0053* (2013.01); *H04W 72/0446* (2013.01); *H04W 72/1289* (2013.01)

(58) Field of Classification Search
CPC ... H04L 1/0027; H04L 1/0028; H04L 1/0039; H04L 5/001; H04L 5/0035; H04L 5/0037;
(Continued)

(56) References Cited

U.S. PATENT DOCUMENTS 9,226,293 B2* 12/2015 Yang ................... H04L 27/2602
2013/0242906 A1* 9/2013 Li ......................... H04L 5/0053
370/329
(Continued)

FOREIGN PATENT DOCUMENTS

| CN | 102264135 A | 11/2011 |
|---|---|---|
| CN | 103733586 A | 4/2014 |

(Continued)

OTHER PUBLICATIONS

Qualcomm Incorporated. "Contents of group common PDCCH", 3GPP TSG-RAN WG1#88bis, Apr. 3-7, 2017, Spokane, WA, USA, total 7 pages, R1-1705604.
(Continued)

*Primary Examiner* — Khaled M Kassim
*Assistant Examiner* — Kai Chang
(74) *Attorney, Agent, or Firm* — Kilpatrick Townsend & Stockton, LLP

(57) ABSTRACT

Disclosed in the present application are an information transmission method and device, for realizing the transmission of information of a group of terminals. The information transmission method provided in the present application comprises: determining information of a group of terminals to be sent; and sending, by means of a group common
(Continued)

physical downlink control channel (PDCCH), the information of the group of terminals.

8 Claims, 4 Drawing Sheets

(58) Field of Classification Search
CPC .. H04L 5/0053; H04L 5/0094; H04W 72/042; H04W 72/0446; H04W 72/121; H04W 72/1289
See application file for complete search history.

(56) References Cited

U.S. PATENT DOCUMENTS

| | | |
|---|---|---|
| 2015/0043391 A1 | 2/2015 | Yin et al. |
| 2016/0007374 A1* | 1/2016 | Lee ................. H04L 1/1864 370/336 |
| 2016/0249337 A1* | 8/2016 | Liang ............. H04W 72/0406 |
| 2016/0295561 A1* | 10/2016 | Papasakellariou .... H04L 5/0055 |
| 2016/0366672 A1 | 12/2016 | Papasakellariou et al. |
| 2017/0367046 A1* | 12/2017 | Papasakellariou .... H04L 5/0048 |
| 2018/0278454 A1* | 9/2018 | Islam .................. H04L 5/0073 |
| 2018/0279297 A1* | 9/2018 | Nogami ............. H04W 72/042 |
| 2019/0165904 A1* | 5/2019 | Jo ..................... H04L 1/0061 |
| 2019/0335478 A1* | 10/2019 | Xiong ............. H04W 72/0446 |
| 2019/0335493 A1* | 10/2019 | Xiong ............. H04W 72/1289 |
| 2019/0349904 A1* | 11/2019 | Kwak ................ H04W 72/042 |
| 2020/0021419 A1* | 1/2020 | Taherzadeh Boroujeni ................ H04L 5/0091 |
| 2021/0135824 A1* | 5/2021 | Horiuchi ............. H04L 5/0094 |

FOREIGN PATENT DOCUMENTS

| | | |
|---|---|---|
| CN | 104683069 A | 6/2015 |
| CN | 105493593 A | 4/2016 |
| CN | 106059740 A | 10/2016 |
| EP | 3480977 A1 | 5/2019 |
| EP | 3580381 A1 | 12/2019 |
| JP | 2019531644 A | 10/2019 |
| WO | 2011074914 A2 | 6/2011 |
| WO | 2016203681 A1 | 11/2018 |

OTHER PUBLICATIONS

Huawei et al: "Group-common NR-PDCCH", 3GPP TSG RAN WG1; R1-1704205, Spokane, USA; Apr. 3, 2017-Apr. 7, 2017.
Panasonic: "Control signalling design on downlink resource allocation", 3GPP TSG RAN WG1; R1-1703279, Athens, Greece; Feb. 13, 2017-Feb. 27, 2017.
CATT: "Further details of group-common control", 3GPP TSG RAN WG1; R1-1704572, Spokane, USA; Apr. 3, 2017-Apr. 7, 2017.
Samsung; "Functionalities for UE-Common NR-PDCCH", 3GPP TSG RAN WG1 #88bis, R1-1705378, Spokane, USA, Apr. 3-7, 2017.

* cited by examiner

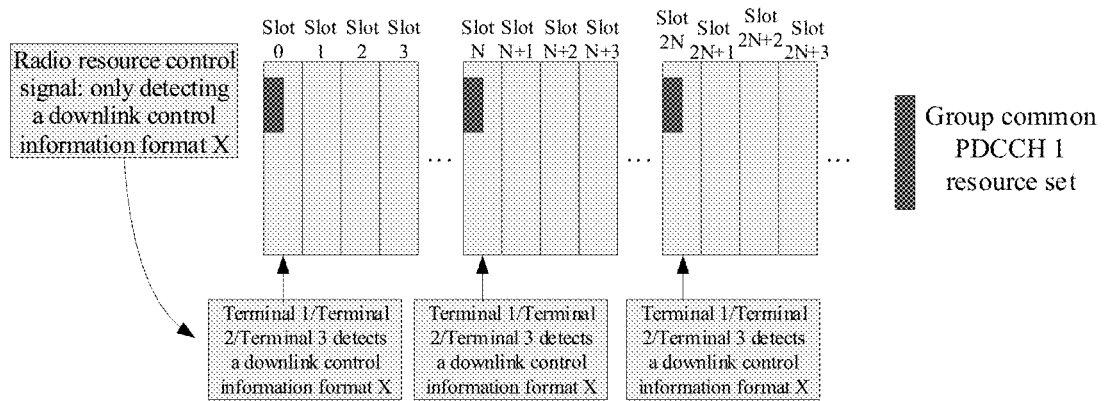

(a) Radio resource control signal configures a terminal to only blindly detect a downlink control information format X

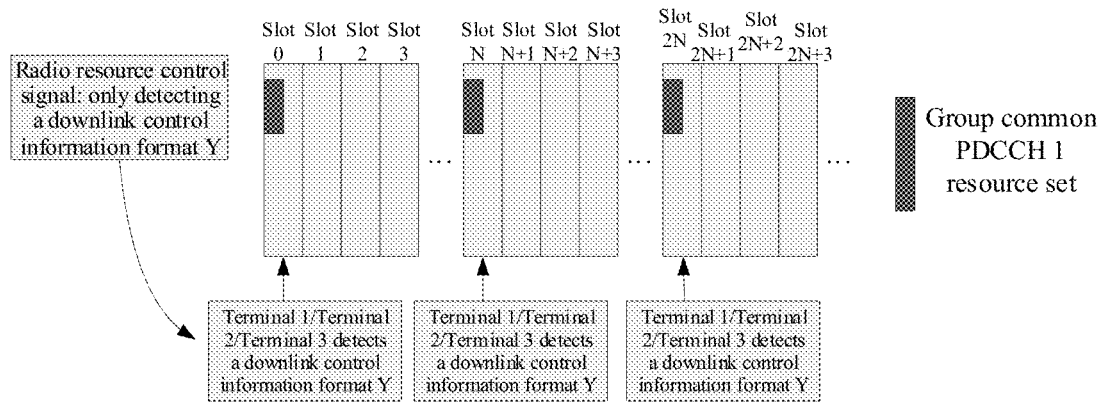

(b) Radio resource control signal configures a terminal to only blindly detect a downlink control information format Y

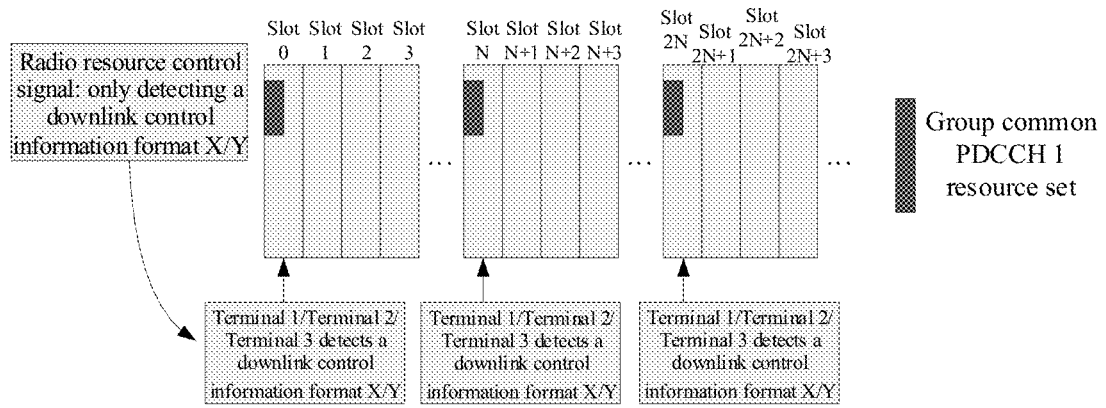

(c) Radio resource control signal configures a terminal to only blindly detectin a downlink control information format X and a downlink control information format Y

Fig. 4

INFORMATION TRANSMISSION METHOD AND DEVICE

The present application is a national stage of International Application No. PCT/CN2018/081760, filed on Apr. 3, 2018, claiming priority to Chinese Patent Application No. 201710309717.8, filed with the Chinese Patent Office on May 4, 2017 and entitled "INFORMATION TRANSMISSION METHOD AND DEVICE", and the present application claims priority to Chinese Patent Application No. 201810282225.9, filed with the Chinese Patent Office on Mar. 28, 2018 and entitled "INFORMATION TRANSMISSION METHOD AND DEVICE", the contents of each of which are incorporated herein by reference in its entirety.

FIELD

The present application relates to the field of communications technologies, and particularly to information transmission methods and devices.

BACKGROUND

For the next generation mobile communications technologies, the brief introduction is as follows.

The mobile Internet is subverting the traditional mobile communication service model, providing users with an unprecedented usage experience, which has a profound impact on all aspects of people's work and life. The mobile Internet will promote the further upgrade of human social information interaction methods, providing users with a richer service experience such as augmented reality, virtual reality, ultra high definition (3D) video, mobile cloud or the like. The further development of the mobile Internet will bring about a thousand times increase in future mobile traffic, and promote a new round of changes in mobile communications technologies and industries. The Internet of Things (IoT) has expanded the range of services for mobile communications, from human-to-human communication to the human-machine and machine-machine intelligent interconnection, making mobile communications technologies penetrated into a wider range of industries and fields. In the future, mobile medical, car networking, smart home, industrial control, environmental monitoring, or the like will promote the explosive growth of IoT applications, and hundreds of billions of devices will access the network to achieve a true "Internet of Everything". At the same time, massive device connectivity and diversified IoT services will also bring new technical challenges to mobile communications.

As new service requirements continue to emerge and become more demanding, higher performance demands are laid on future mobile communications systems, such as higher peak rates, better user experience rates, smaller latency, higher reliability, higher spectral efficiency and higher energy efficiency, and it is required to support more user access and to use various types of services.

A physical downlink control channel (PDCCH) of the LTE system is used for carrying scheduling information and other control information. There may be a plurality of PDCCHs in a control area of each downlink subframe. User equipment (UE) tries to decode each PDCCH in the search space according to the format of to-be-monitored downlink control information (DCI).

To sum up, in the existing LTE system, the UE blindly detects its own PDCCH according to the desired information. In the future mobile communications system, it is necessary to introduce scheduling or to notify related information of a group of terminals, but there is no solution on how to transmit information of a group of terminals at present.

SUMMARY

Embodiments of the present application provide an information transmission method and device, for realizing the transmission of information of a group of terminals.

On a network side, for example, on a base station side, an information transmission method provided in embodiments of the present application includes: determining information of a group of terminals to be sent; and sending, through a group common PDCCH, the information of the group of terminals.

In embodiments of the present application, the information of a group of terminals is sent through the group common PDCCH, thereby realizing the transmission of the information of a group of terminals.

Optionally, different types of information of the group of terminals are sent using at least one DCI format through the group common PDCCH.

In embodiments of the present application, different types of information of a group of terminals are sent using at least one DCI format through the group common PDCCH, so that the sending of different types of information of a group of terminals is more flexible, and different transmission requirements of different information can be met.

Optionally, the information of the group of terminals at least includes: a slot format indication, the slot format indication is sent using a first DCI format, and information other than the slot format indication is sent using at least one DCI format other than the first DCI format.

Optionally, the sending periods of information sent using different DCI formats are different.

Optionally, the sending, through the group common PDCCH, the information of the group of terminals includes: sending, through high layer signaling, related information of at least one DCI format; or sending, on the group common PDCCH, different types of information of the group of terminals using at least one DCI format.

Optionally, the related information of the at least one DCI format includes: an information sending period corresponding to a DCI format used for sending the information of the group of terminals, and/or indication information of the DCI format that needs to be detected by the terminal.

Accordingly, on a terminal side, an information transmission method provided in embodiments of the present application includes: detecting a group common PDCCH; and obtaining information of a group of terminals from the group common PDCCH.

Optionally, the information of the group of terminals is sent using at least one DCI format through the group common PDCCH.

Optionally, the detecting the group common PDCCH includes: receiving, through high layer signaling, related information of the at least one DCI format, and detecting the group common PDCCH according to the related information of the at least one DCI format; or detecting, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

Corresponding to the method on the network side, an information transmission device provided in embodiments of the present application includes: a determining unit, used for determining information of a group of terminals to be sent; and a sending unit, used for sending, through a group common PDCCH, the information of the group of terminals.

Optionally, the sending unit sends different types of information of the group of terminals using at least one DCI format through the group common PDCCH.

Optionally, the information of the group of terminals at least includes: a slot format indication; the slot format indication is sent using a first DCI format, and information other than the slot format indication is sent using at least one DCI format other than the first DCI format.

Optionally, the sending periods of information sent using different DCI formats are different.

Optionally, the sending unit is used for: sending, through high layer signaling, related information of at least one DCI format; or sending, on the group common PDCCH, different types of information of the group of terminals using at least one DCI format.

Optionally, the related information of the at least one DCI format includes: an information sending period corresponding to a DCI format used for sending the information of the group of terminals, and/or indication information of the DCI format that needs to be detected by the terminal.

Corresponding to the method on the terminal side, an information transmission device provided in embodiments of the present application includes: a detecting unit, used for detecting a group common PDCCH; and an obtaining unit, used for obtaining information of the group of terminals from the group common PDCCH.

Optionally, the information of the group of terminals is sent using at least one DCI format through the group common PDCCH.

Optionally, the detecting unit is specifically used for: receiving, through high layer signaling, the related information of the at least one DCI format, and detecting the group common PDCCH according to the related information of the at least one DCI format; or detecting, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

Optionally, corresponding to the method on the network side, a second information transmission device provided in embodiments of the present application includes: a memory, used for storing a program instruction; and a processor, used for calling the program instruction stored in the memory to perform operations based on an obtained program, the operations including: determining information of a group of terminals to be sent; and controlling a transceiver to send the information of the group of terminals through a group common PDCCH.

Optionally, the processor controls the transceiver to send different types of information of the group of terminals using at least one DCI format through the group common PDCCH.

Optionally, the information of the group of terminals at least includes: a slot format indication; the slot format indication is sent using a first DCI format, and information other than the slot format indication is sent using at least one DCI format other than the first DCI format.

Optionally, the sending periods of information sent using different DCI formats are different.

Optionally, the processor controls the transceiver to send related information of at least one DCI format through high layer signaling; or the processor controls the transceiver to send, on the group common PDCCH, different types of information of the group of terminals using at least one DCI format.

Optionally, the related information of the at least one DCI format includes: an information sending period corresponding to a DCI format used for sending the information of the group of terminals, and/or indication information of the DCI format that needs to be detected by the terminal.

Corresponding to the method on the terminal side, a second information transmission device provided in embodiments of the present application includes: a memory, used for storing a program instruction; and a processor, used for calling the program instruction stored in the memory to perform operations based on an obtained program, the operations including: detecting a group common PDCCH by using a transceiver; and obtaining information of a group of terminals from the group common PDCCH.

Optionally, the information of the group of terminals is sent using at least one DCI format through the group common PDCCH.

Optionally, the processor controls the transceiver to receive related information of the at least one DCI format through high layer signaling, and detect the group common PDCCH according to the related information of the at least one DCI format; or the processor controls the transceiver to detect, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

Embodiments of the present application provide a computer storage medium, wherein the computer storage medium stores a computer executable instruction, and the computer executable instruction is used to enable a computer to perform any one of the foregoing methods.

BRIEF DESCRIPTION OF THE DRAWINGS

To describe the technical solutions in embodiments of the present application more clearly, the accompanying drawings required for describing embodiments will be briefly described below. Apparently, the accompanying drawings in the following description show merely some embodiments of the present application, and a person of ordinary skill in the art may still derive other drawings from these accompanying drawings without creative efforts.

FIG. 4 is a flow diagram of a second information transmission method between a base station and a terminal according to an embodiment of the present application;

DETAILED DESCRIPTION OF EMBODIMENTS

Figure 1:
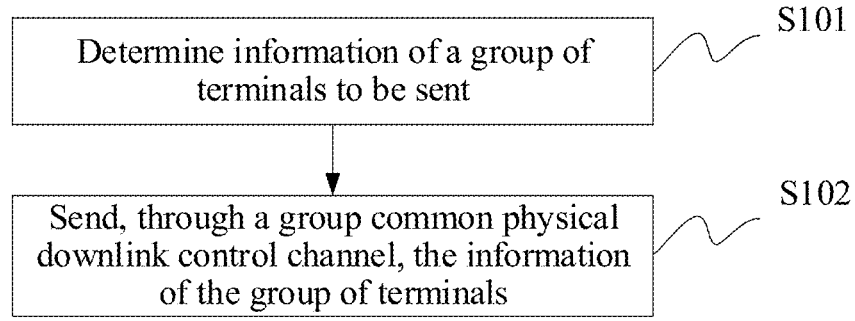
FIG. 1 is a flow diagram of an information transmission method on a base station side according to an embodiment of the present application.

Embodiments of the present application provide an information transmission method and device, for realizing the transmission of information of a group of terminals.

With the development of mobile technology, future mobile communications systems need to provide lower network delay and support a wider variety of services. A downlink control channel may inform or schedule one terminal, all terminals within a base station, or a group of terminals within the base station. The downlink control channel is various in type and the transmission mode is more flexible. A downlink control channel for scheduling one terminal to transmit data can be sent by the base station when data needs to be transmitted from the terminal, and a common control channel for scheduling all terminals in the base station can be transmitted in a common search space every slot.

In embodiments of the present application, information of a group of terminals is carried by a group common PDCCH. What the information of the group of terminals specifically includes is not limited in embodiments of the present application. Considering that the information carried by the group common PDCCH does not need to be transmitted at the same time, some information requires a higher transmission frequency for transmission, and other information requires a lower transmission frequency. Therefore, the information carried by the group common PDCCH can be transmitted in different downlink control information (DCI) formats according to the information type.

The group common PDCCH in embodiments of the present application carries information of a group of terminals, and the group of terminals includes at least one terminal.

The terminal in embodiments of the present application is also referred to as UE. The UE may be stationary or mobile. The UE may be also referred to as a mobile station, a subscriber unit, station, or the like. The UE may be a cellular telephone, a personal digital assistant (PDA), a wireless modem, a wireless communications device, a handheld device, a laptop computer, a cordless telephone, a wireless local loop (WLL) station, a tablet computer, or the like. The UE can communicate with network side devices such as a macro eNB, a pico eNB, a femto eNB, and a relay station.

In embodiments of the present application, information of a group of terminals that needs to be transmitted through the group common PDCCH, for example, slot structure indication information, PDCCH monitor related information, transmission and receiving point (TRP) configuration information, and the like, may be transmitted using different DCI formats.

At least one type of DCI format is used for carrying the information of a group of UEs by the group common PDCCH, for example, two types: a DCI format X (or referred to as the first DCI format) and a DCI format Y (or referred to as at least one type of DCI formats other than the first DCI format).

Optionally, different information can be transmitted using different DCI formats.

For example, information to be sent using the DCI format X includes: slot format indication for indicating a structure of a slot. The structure of the slot is used, for example, to indicate the number of downlink (DL) orthogonal frequency division multiplexing (OFDM) symbols, the number of uplink (UL) OFDM symbols, the number of guard period (GP) OFDM symbols, or the like. The terminal needs to know the structure of the slot to determine which symbols may be used for uplink transmission and which symbols may be used for downlink transmission.

Other information can be transmitted using the DCI format Y, and the other information may include such as a downlink control channel detection period, subcarrier space (SCS) information (or referred to as numerology information), transmission and receiving point (TRP) information, or the like.

The information to be sent using different DCI formats can be divided according to different rules. For example, the rules include sending period and importance level of the information to be carried by the group common PDCCH. Specifically, it can be specified by a protocol. For example, slot format information is necessary, so it is important and has higher importance level, and can be transmitted using one DCI format. Some information plays a role in auxiliary transmission, so it can be considered as having a lower important level, and can be transmitted using another DCI format.

Information can be transmitted using different DCI formats on the group common PDCCH in the same slot.

The transmission periods of information transmitted using different DCI formats may be different. For example, information transmitted using a DCI format X needs to be sent once every N slots, and information transmitted using a DCI format Y needs to be sent once every 2N slots.

Base Station Side:

The base station sends information of a group of terminals on a group common PDCCH. Specifically, the information can be sent by using the following two approaches.

Approach 1: A base station and a terminal predefine information content carried by different DCI formats, subsequently the base station notifies the terminal of the related information of the DCI formats through high layer signaling, for example, an information sending period corresponding to each DCI format, and/or indication information used to indicate the DCI format type that the terminal needs to receive, and the terminal may detect the corresponding DCI format according to the related information and obtain corresponding information.

The information sending periods corresponding to different DCI formats may be different. For example, the information sending period corresponding to the DCI format X is N slots, and the information sending period corresponding to the DCI format Y is 2N slots, N is a preset positive integer.

The base station informs the terminal of the indication information used to indicate the DCI format type that the terminal needs to receive through the high layer signaling. For example, the base station notifies the terminal that only the DCI format X needs to be received and detected, or the base station notifies the terminal that only the DCI format Y needs to be received and detected, or the base station notifies the terminal that the DCI format X and the DCI format Y need to be received and detected.

Approach 2: A base station sends information of a group of terminals using a DCI format X and/or a DCI format Y on a group common PDCCH.

To sum up, referring to FIG. 1, on a network side, for example, on a base station side, an information transmission method provided in embodiments of the present application includes the following steps.

S101: determining information of a group of terminals to be sent.

S102: sending, through a group common PDCCH, the information of the group of terminals.

Optionally, different types of information of the group of terminals are sent using at least one DCI format through the group common PDCCH.

Optionally, the information of the group of terminals at least includes: a slot format indication; the slot format indication is sent using a first DCI format, and information other than the slot format indication is sent by using at least one DCI format other than the first DCI format.

For example, the information other than the slot format indication includes downlink control channel detection period, subcarrier space information, and transmission and receiving point information.

Optionally, the sending periods of information sent using different DCI formats are different.

Optionally, the step of sending, through a group common PDCCH, the information of the group of terminals specifically includes: sending, through high layer signaling, related information of at least one DCI format; or sending, on the group common PDCCH, different types of information of the group of terminals using at least one DCI format.

Optionally, the related information of the at least one DCI format includes: an information sending period corresponding to a DCI format used for sending the information of the group of terminals, and/or indication information of the DCI format that needs to be detected by the terminal.

An information transmission method on a terminal side corresponding to the foregoing information transmission method on the network side will be described below.

Approach 1: if a base station and a terminal have predefined information content transmitted using different DCI formats, then the terminal receives a group common PDCCH according to DCI format related information notified through high layer signaling.

If the base station notifies the terminal of the transmission periods of different DCI formats through the high layer signaling, for example, the transmission period of a DCI format X is N slots, and the transmission period of a DCI format Y is 2N, then the terminal detects and receives the group common PDCCH according to the DCI format X every N slots, and detects and receives the group common PDCCH according to the DCI format Y every 2N slots.

Alternatively, the base station notifies the terminal of the DCI format type that the terminal needs to detect and receive through the high layer signaling, and it is assumed that there are two types of DCI formats transmitted on the group common PDCCH: a DCI format X and a DCI format Y.

For example, if the base station notifies the terminal that the DCI format X needs to be detected and received by the terminal through the high layer signaling, the terminal detects and receives the group common PDCCH in each group common PDCCH resource set according to the DCI format X. Alternatively, if the base station notifies the terminal that the DCI format Y needs to be detected and received by the terminal through the high layer signaling, the terminal detects and receives the group common PDCCH in each group common PDCCH resource set according to the DCI format Y. Alternatively, if the base station notifies the terminal that the DCI format X and the DCI format Y need to be detected and received by the terminal through the high layer signaling, the terminal detects and receives the group common PDCCH in each group common PDCCH resource set according to the DCI format X and the DCI format Y.

Approach 2: If the base station directly notifies the terminal of the DCI format that the terminal needs to detect, that is, the base station sends the information of a group of terminals using at least one DCI format on the group common PDCCH in an explicit mode, the terminal detects and receives the group common PDCCH in each group common PDCCH resource set according to the DCI format X and/or the DCI format Y.

Figure 2:
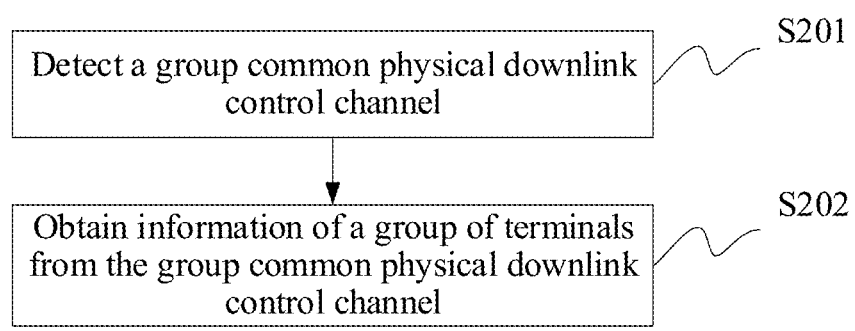
FIG. 2 is a flow diagram of an information transmission method on a terminal side according to an embodiment of the present application.

To sum up, on a terminal side, referring to FIG. 2, an information transmission method provided in embodiments of the present application includes the following steps.

S201: detecting a group common PDCCH.

S202: obtaining information of a group of terminals from the group common PDCCH.

Optionally, the information of the group of terminals is sent using at least one DCI format through the group common PDCCH.

Optionally, the step of detecting a group common PDCCH specifically includes: receiving, through high layer signaling, related information of at least one DCI format, and detecting the group common PDCCH according to the related information of the at least one DCI format; or detecting, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

Three specific embodiments are described in details below.

Figure 3:
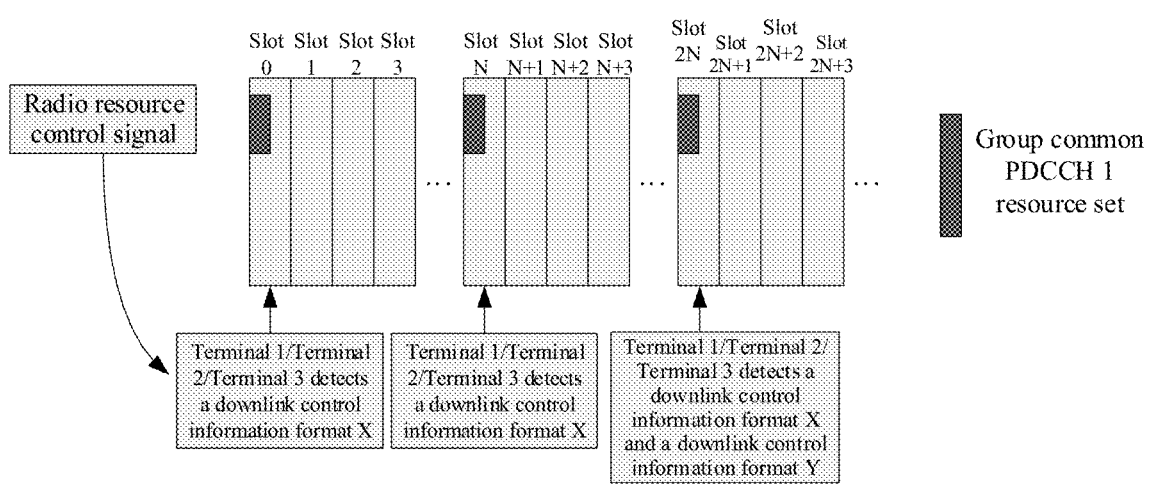
FIG. 3 is a flow diagram of an information transmission method performed between a base station and a terminal according to an embodiment of the present application.

Embodiment 1 referring to FIG. 3, it is assumed that information transmitted on a group common PDCCH is carried by two DCI formats, such as a DCI format X and a DCI format Y. The information transmitted using the DCI format X at least includes structure information of a slot, and the information transmitted using the DCI format Y includes other information, such as a downlink control channel detection period, numerology information, TRP information, or the like. Certainly, this is just a possible example herein, and the information contained in the information sent using the DCI format X and the DCI format Y can be determined according to specific needs. It is assumed that UE 1, UE 2, and UE 3 need to detect and receive a group common PDCCH 1. It is assumed that a base station notifies, through high layer signaling, for example, a radio resource control (RRC) signal, the terminal that the sending period of the group common PDCCH is N slots, the sending period of the information sent using the DCI format X is N slots, and the sending period of the information transmitted using the DCI format Y is 2N slots, N is a positive integer greater than or equal to 1. The terminal detects and receives the information sent according to the DCI format X every N slots, and obtains the information sent using the DCI format X, for example, the structure indication information of the slot; and the terminal detects and receives the information sent according to the DCI format Y every 2N slots, and obtains the information sent using the DCI format Y, for example, a downlink control channel detection period, numerology information, TRP information, or the like.

Embodiment 2 referring to FIG. 4, it is assumed that information transmitted on a group common PDCCH is carried by two DCI formats, such as a DCI format X and a DCI format Y. The information sent using the DCI format X at least includes structure information of a slot, and the information sent using the DCI format Y includes other information, such as a downlink control channel detection period, numerology information, TRP information, or the like. Certainly, this is just a possible example herein, and the information contained in the information sent using the DCI format X and the DCI format Y can be determined according to specific needs. It is assumed that UE 1, UE 2, and UE 3 need to detect and receive a group common PDCCH 1. It is assumed that the base station notifies, through high layer signaling, for example, RRC signaling, the terminal that the sending period of the group common PDCCH is N slots. At the same time, the base station notifies, through RRC signaling, the terminal of the DCI format that needs to be detected and received. For example, if the base station notifies, through RRC signaling, the terminal that the DCI format to be detected by the terminal UE 1/UE 2/UE 3 is a DCI format X, the terminal UE 1/UE 2/UE 3 receives only the information sent using the DCI format X in a group common PDCCH resource set. For example, if the base station notifies, through RRC signaling, the terminal that the DCI format to be detected by the terminal UE 1/UE 2/UE 3 is a DCI format Y, the terminal UE 1/UE 2/UE 3 receives only the information sent using the DCI format Y in the group common PDCCH resource set. For example, if the base station notifies, through RRC signaling, the terminal that the DCI format to be detected by the terminal UE 1/UE 2/UE 3 includes a DCI format X and a DCI format Y, the terminal UE 1/UE 2/UE 3 receives the information sent using the DCI format X and the DCI format Y in the group common PDCCH resource set.

Figure 5:
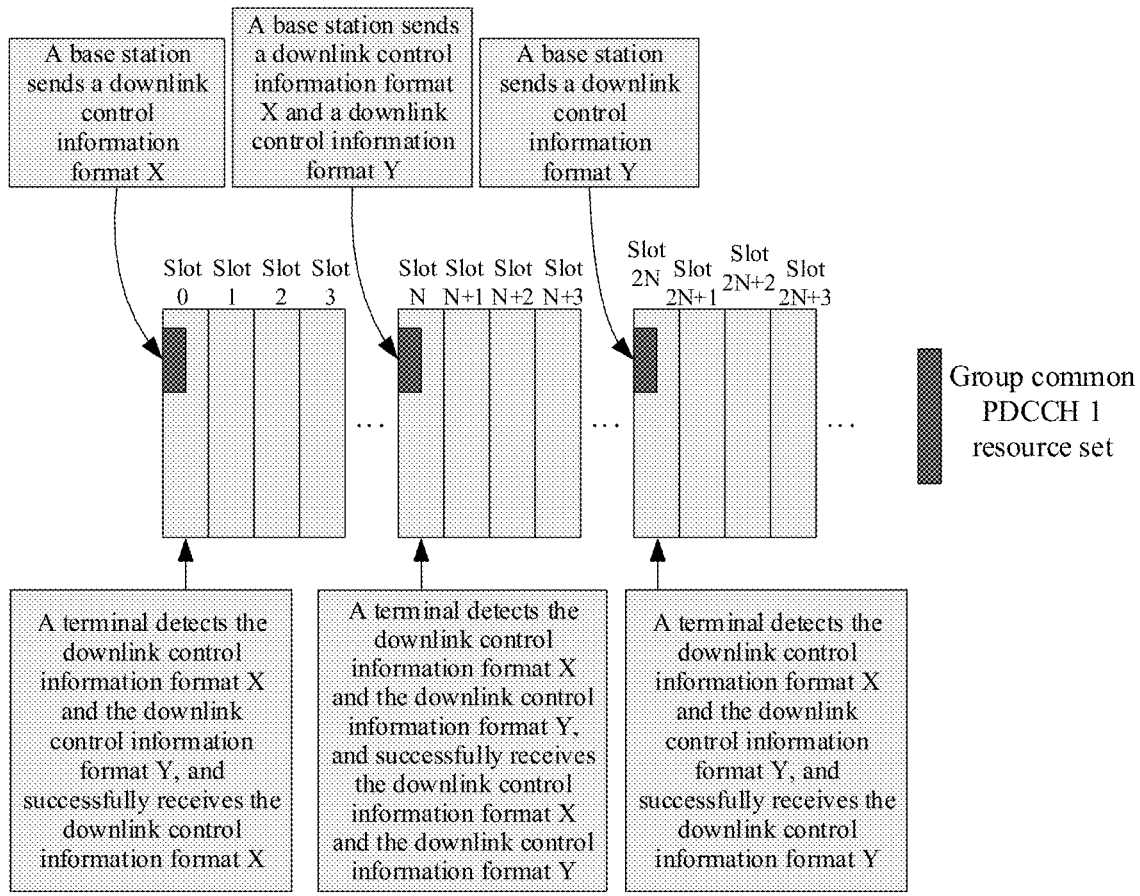
FIG. 5 is a flow diagram of a third information transmission method between a base station and a terminal according to an embodiment of the present application.

Embodiment 3 referring to FIG. 5, it is assumed that information transmitted on a group common PDCCH is carried by two DCI formats, such as a DCI format X and a DCI format Y. The information sent using the DCI format X at least includes structure information of a slot, and the information sent using the DCI format Y includes other information, such as a downlink control channel detection period, numerology information, TRP information, or the like. Certainly, this is just a possible example herein, and the information contained in the information sent using the DCI format X and the DCI format Y can be determined according to specific needs. It is assumed that UE 1, UE 2, and UE 3 need to detect and receive a group common PDCCH 1. It is assumed that the base station notifies, through high layer signaling, for example, RRC signaling, the terminal that the sending period of the group common PDCCH is N slots. The base station sends the information of a group of terminals in each group common PDCCH resource set using the DCI format X and/or the DCI format Y as needed. The terminal detects and receives the information in each group common PDCCH resource set by using the DCI format X and/or the DCI format Y as needed. For example, if the base station sends information of a group of terminals only using the DCI format X in a group common PDCCH resource set on the slot 0, the terminal detects the DCI format X and the DCI format Y in the resource set, and finally only successfully detects the DCI format X, and obtains the information sent using the DCI format X, such as the structure indication information of the slot. For another example, if the base station sends information of a group of terminals in the slot N by using the DCI format X and the DCI format Y, the terminal detects the DCI format X and the DCI format Y in a group common PDCCH resource set on the slot N, detects the DCI format X and the DCI format Y, and successfully obtains the information sent using the DCI format X and the DCI format Y.

Embodiment 4 it is assumed that information transmitted on a group common PDCCH is carried by a plurality of DCI formats, such as a DCI format X, a DCI format Y and a DCI format Z. Information transmitted using the DCI format X at least contains structure information of a slot, and the information sent using the DCI format Y and the DCI format Z contains other information, such as a downlink control channel detection period, numerology information, TRP information, pre-emption, transmission power control command (TPC command) information, or the like. The other information is respectively carried by different DCI formats according to the information type, for example, the information transmitted using the DCI format Y includes pre-emption information, and the information transmitted using the DCI format Z includes TPC command information. It is assumed that UE 1, UE 2, and UE 3 need to detect and receive a group common PDCCH 1. It is assumed that the base station notifies, through high layer signaling, for example, RRC signaling, the terminal that the sending period of the group common PDCCH is N slots. At the same time, the base station notifies, through RRC signaling, the terminal of the DCI format that needs to be detected and received. For example, if the base station notifies, through RRC signaling, the terminal that the DCI format to be detected by the terminal UE 1/UE 2/UE 3 is a DCI format X, the terminal UE 1/UE 2/UE 3 receives only the information sent using the DCI format X in a group common PDCCH resource set. For example, if the base station notifies, through RRC signaling, the terminal that the DCI format to be detected by the terminal UE 1/UE 2/UE 3 includes a DCI format Y and a DCI format Z, the terminal UE 1/UE 2/UE 3 receives the information sent using the DCI format Y and the DCI format Z in a group common PDCCH resource set. For example, if the base station notifies, through RRC signaling, the terminal that the DCI format to be detected by the terminal UE 1/UE 2/UE 3 includes a DCI format X, a DCI format Y and a DCI format Z, the terminal UE 1/UE 2/UE 3 receives the information sent using the DCI format X, the DCI format Y and the DCI format Z in a group common PDCCH resource set. The types of DCI formats transmitted on the group common PDCCH are not limited in this embodiment, and the number of DCI formats is not limited to three.

Figure 6:
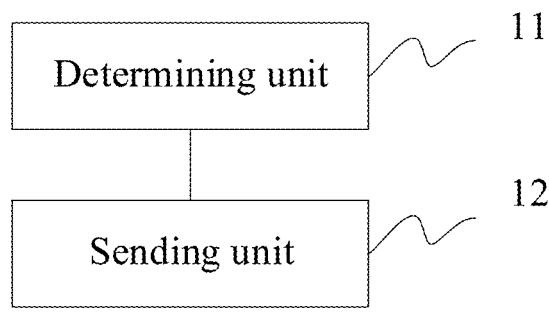
FIG. 6 is a structural schematic diagram of an information transmission device on a base station side according to an embodiment of the present application.

Corresponding to the method on the network side, referring to FIG. 6, an information transmission device provided in this embodiment of the present application includes: a determining unit 11, used for sending information of a group of terminals to be sent; and a sending unit 12, used for sending, through a group common PDCCH, the information of the group of terminals.

Optionally, the sending unit sends different types of information of the group of terminals using at least one DCI format through the group common PDCCH.

Optionally, the information of the group of terminals at least includes: a slot format indication; the slot format indication is sent using a first DCI format, and information other than the slot format indication is sent using at least one DCI format other than the first DCI format.

Optionally, the sending periods of information sent using different DCI formats are different.

Optionally, the sending unit is used for: sending, through high layer signaling, related information of at least one DCI format; or sending, on the group common PDCCH, different types of information of the group of terminals in the at least one DCI format.

Optionally, the related information of the at least one DCI format includes: an information sending period corresponding to a DCI format used for sending the information of the group of terminals, and/or indication information of the DCI format that needs to be detected by the terminal.

Figure 7:
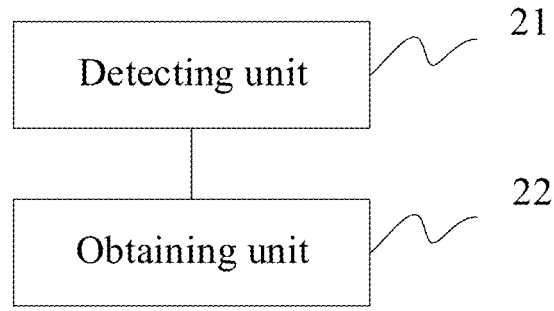
FIG. 7 is a structural schematic diagram of an information transmission device on a terminal side according to an embodiment of the present application.

Corresponding to the method on the terminal side, referring to FIG. 7, an information transmission device provided in this embodiment of the present application includes: a detecting unit 21, used for detecting a group common PDCCH; and an obtaining unit 22, used for obtaining information of a group of terminals from the group common PDCCH.

Optionally, the information of the group of terminals is sent using at least one DCI format through the group common PDCCH.

Optionally, the detecting unit is used for: receiving, through high layer signaling, related information of at least one DCI format, and detecting the group common PDCCH according to the related information of the at least one DCI format; or detecting, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

Figure 8:
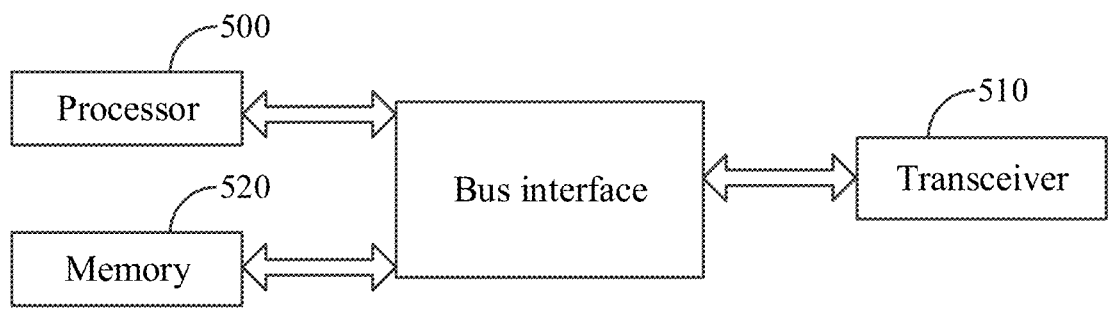
FIG. 8 is a structural schematic diagram of another information transmission device on a base station side according to an embodiment of the present application.

On a network side, referring to FIG. 8, another information transmission device provided in this embodiment of the present application includes: a processor 500, used for reading a program in a memory 520, to perform the following operations: determining information of a group of terminals to be sent; and controlling a transceiver 510 to send the information of the group of terminals through a group common PDCCH.

Optionally, the processor 500 controls the transceiver 510 to send different types of information of the group of terminals using at least one DCI format through the group common PDCCH.

Optionally, the information of the group of terminals at least includes: a slot format indication; the slot format indication is sent using a first DCI format, and information other than the slot format indication is sent using at least one DCI format other than the first DCI format.

Optionally, the sending periods of information sent using different DCI formats are different.

Optionally, the processor 500 controls the transceiver 510 to send related information of the at least one DCI format through high layer signaling; or the processor 500 controls the transceiver 510 to send, on the group common PDCCH, different types of information of the group of terminals using at least one DCI format.

Optionally, the related information of the at least one DCI format includes: an information sending period corresponding to a DCI format used for sending the information of the group of terminals, and/or indication information of the DCI format that needs to be detected by the terminal.

The transceiver 510 is used for receiving and sending data under the control of the processor 500.

In FIG. 8, a bus architecture may include any quantity of interconnected buses and bridges; and specifically, various circuits of one or more processors represented by the processor 500 and a memory represented by the memory 520 are linked together. The bus architecture may further connect various other circuits such as a peripheral device, a voltage stabilizer, and a power management circuit. These are well-known in the art, and therefore are not further described in this description. The bus interface provides an interface. The transceiver 510 can be a plurality of components, including a transmitter and a transceiver, to provide a unit for communicating with various other devices on a transmission medium. The processor 500 is responsible for bus architecture management and general processing. The memory 520 may store data used when the processor 500 executes an operation.

The processor 500 may be a central processing unit (CPU), an application specific integrated circuit (ASIC), a field-programmable gate array (FPGA), or a complex programmable logic device (CPLD).

Figure 9:
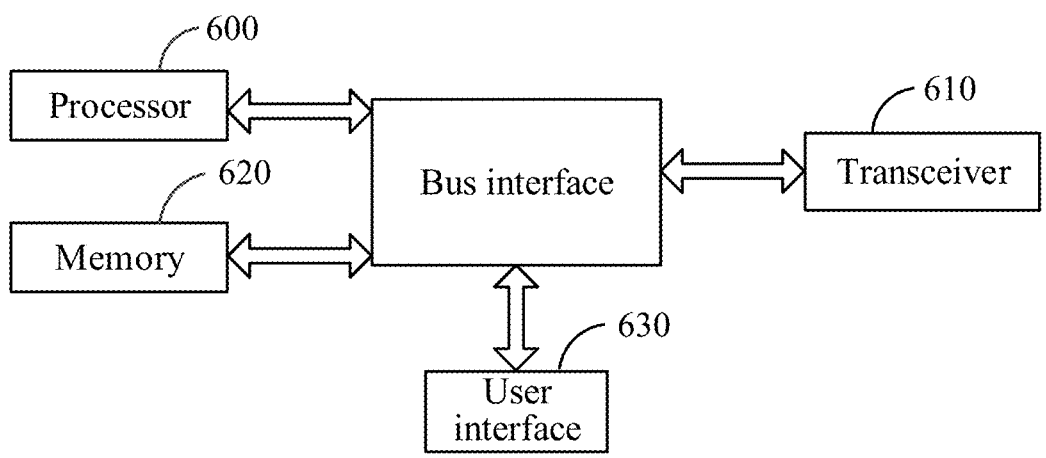
FIG. 9 is a structural schematic diagram of another information transmission device on a terminal side according to an embodiment of the present application.

On a terminal side, referring to FIG. 9, another information transmission device provided in this embodiment of the present application, for example, UE, includes: a processor 600, used for reading a program in a memory 620, to perform the following operations: detecting a group common PDCCH by using a transceiver 600; and obtaining information of a group of terminals from the group common PDCCH.

Optionally, the information of the group of terminals is sent using at least one DCI format through the group common PDCCH.

Optionally, the processor 600 controls the transceiver 610 to receive related information of the at least one DCI format through high layer signaling, and detect the group common PDCCH based on the related information of the at least one DCI format; or the processor 600 controls the transceiver 610 to detect, within each group common PDCCH resource set, the group common PDCCH according to the at least one DCI format.

Optionally, the related information of the at least one DCI format includes: an information sending period corresponding to a DCI format used for sending the information of the group of terminals, and/or indication information of the DCI format that needs to be detected by the terminal.

The transceiver 610 is used for receiving and sending data under the control of the processor 600.

In FIG. 9, a bus architecture may include any quantity of interconnected buses and bridges; specifically, various circuits of one or more processors represented by the processor 600 and a memory represented by the memory 620 are linked together. The bus architecture may further connect various other circuits such as a peripheral device, a voltage stabilizer, and a power management circuit. These are well-known in the art, and therefore are not further described in this description. The bus interface provides an interface. The transceiver 610 can be a plurality of components, including a transmitter and a receiver, to provide a unit for communicating with various other devices on a transmission medium. For different user equipment, the user interface 630 may also be an interface capable of externally or internally connecting the required devices, and the connected devices include but are not limited to a keypad, a display, a speaker, a microphone, a joystick, or the like.

The processor 600 is responsible for bus architecture management and general processing. The memory 620 may store data used when the processor 600 executes an operation.

Optionally, the processor 600 may be a central processing unit (CPU), an application specific integrated circuit (ASIC), a field-programmable gate array (FPGA), or a complex programmable logic device (CPLD).

Any of the information transmission devices on the terminal side provided in embodiments of the present application may be any type of terminal device.

The terminal device may also be referred to as user equipment ("UE" for short), a mobile station ("MS" for short), a mobile terminal, or the like. Optionally, the terminal may have the ability to communicate with one or more core networks via a radio access network (RAN). For example, the terminal can be a mobile phone (or referred to as a "cellular" phone), or a computer with mobile performance. For example, the terminal can also be a portable, pocket, handheld, computer built-in or vehicle-mounted mobile device.

Any of the information transmission devices on the network side provided in embodiments of the present application may be any type of network device or any type of base station.

The network device may be a base station (for example, an access point), and may refer to a device in communication with a wireless terminal via one or more sectors at an air interface in an access network. The base station may be configured to mutually convert a received over-the-air frame and an IP packet and serve as a router between the wireless terminal and a rest portion of the access network, wherein the rest portion of the access network may include an Internet protocol (IP) network. The base station may also coordinate attribute management of the air interface. For example, the base station may be a base station (BTS, Base Transceiver Station) in GSM or CDMA, may also be a base station (NodeB) in WCDMA, may further be an evolved NodeB (NodeB, eNB, or e-NodeB, evolutional Node B) in the LTE, and may also be a network device (gNB) in a 5G system, which is not limited in embodiments of the present disclosure.

Embodiments of the present application provide a computer storage medium for storing a computer program instruction used by the devices provided in the foregoing embodiments of the present application, and the instruction includes a program for executing any one of the information transmission methods provided in the foregoing embodiments of the present application.

The computer storage medium can be any available medium or data storage device accessible by a computer, including but not limited to a magnetic storage (for example, floppy disk, hard disk, magnetic tape, magneto-optical disk (MO), or the like), an optical storage (for example, CD, DVD, BD, HVD, or the like), a semiconductor memory (for example, ROM, EPROM, EEPROM, non-volatile memory (NAND FLASH), solid-state disk (SSD)), and the like.

To sum up, in embodiments of the present application, information of a group of terminals is carried by a group common PDCCH. Further, the information may be transmitted using different DCI formats. Further, the information transmitted using different DCI formats may be different, and is transmitted by using the same or different transmission periods. Therefore, the technical solution provided in embodiments of the present application can make the transmission of information of a group of terminals carried by the group common PDCCH be more flexible between the base station and the terminal.

A person skilled in the art should understand that, embodiments of the present application may be provided as a method, system, or computer program product. Therefore, the present application may be used in a form of complete hardware embodiment, complete software embodiment, or embodiment combining software and hardware aspects. Furthermore, the present application may be used in a form of computer program product implemented on one or more computer-applicable storage media (which include but are not limited to a magnetic disk memory and an optical memory) that contain computer-applicable program code.

The present application is described with reference to the flow diagrams and/or block diagrams of the methods, devices (systems), and computer program products according to embodiments of the present application. It should be understood that computer program instructions may be used to implement each process and/or each block in the flow diagrams and/or the block diagrams and a combination of a process and/or a block in the flow diagrams and/or the block diagrams. The computer program instructions may be provided to processors of universal computers, dedicated computers, embedded processing machines, or other programmable data processing devices to generate a machine to enable the instructions executed by the processors of the computers or other programmable data processing devices to generate device for implementing the functions specified in one process or multiple processes in the flow diagrams and/or one block or multiple blocks in the block diagrams.

These computer program instructions may also be stored in a computer readable memory that can instruct the computer or any other programmable data processing devices to work in a specific approach, so that the instructions stored in the computer readable memory generate an artifact that includes an instruction device. The instruction device implements a specific function in one or more processes in the flow diagrams and/or in one or more blocks in the block diagrams.

These computer program instructions may be loaded onto a computer or other programmable data processing devices, so that a series of operations and steps are performed on the computer or other programmable devices, thereby generating computer-implemented processing. Therefore, the instructions executed on the computer or other programmable devices provide steps for implementing a specific function in one or more processes in the flow diagrams and/or in one or more blocks in the block diagrams.

Obviously, a person skilled in the art can make various modifications and variations to the present application without departing from the spirit and scope of the present application. The present application is intended to cover these modifications and variations of the present application provided that they fall within the scope of protection defined by the following claims and their equivalent technologies.

What is claimed is:

1. An information transmission method, comprising:
    determining information of a group of terminals to be sent;
    sending, through high layer signaling, related information of at least one DCI format, wherein the related information of at least one DCI format comprises at least one of: an information sending period corresponding to a DCI format used for sending the information of the group of terminals, or indication information of a DCI format to be detected by the terminals;

sending, through a group common physical downlink control channel (PDCCH), the information of the group of terminals using the at least one DCI format, wherein different types of information of the group of terminals are sent using the at least one downlink control information (DCI) format through the group common PDCCH, and wherein the information of the group of terminals at least comprises:

a slot format indication;

the slot format indication is sent using a first DCI format, and information other than the slot format indication is sent using at least one DCI format other than the first DCI format.

2. The method according to claim 1, wherein sending periods of information sent using different DCI formats are different.

3. An information transmission device, comprising:

a memory, used for storing a program instruction; and a processor, used for calling the program instruction stored in the memory to perform the method according to claim 1.

4. A non-transitory computer storage medium, wherein the computer storage medium stores a computer executable instruction, and the computer executable instruction is used to enable a computer to perform the method according to claim 1.

5. An information transmission method, comprising:

receiving, through high layer signaling, related information of at least one DCI format and detecting a group common physical downlink control channel (PDCCH), wherein the related information of at least one DCI format comprises at least one of: an information sending period corresponding to a DCI format used for sending the information of the group of terminals, or indication information of a DCI format to be detected by the terminals;

obtaining information of a group of terminals from the group common PDCCH;

wherein the information of the group of terminals is sent using at least two DCI format through the group common PDCCH, wherein different types of information of the group of terminals are sent using the at least one downlink control information (DCI) format through the group common PDCCH, and wherein the information of the group of terminals at least comprises:

a slot format indication;

the slot format indication is sent using a first DCI format, and information other than the slot format indication is sent using at least one DCI format other than the first DCI format.

6. The device according to claim 1, wherein the sending periods of information sent using different DCI formats are different.

7. A non-transitory computer storage medium, wherein the computer storage medium stores a computer executable instruction, and the computer executable instruction is used to enable a computer to perform the method according to claim 5.

8. An information transmission device, comprising:

a memory, used for storing a program instruction; and a processor, used for calling the program instruction stored in the memory to perform operations based on an obtained program, the operations comprising:

receiving, through high layer signaling, related information of at least one DCI format and detecting a group common physical downlink control channel (PDCCH) by using a transceiver, wherein the related information of at least one DCI format comprises at least one of: an information sending period corresponding to a DCI format used for sending the information of the group of terminals, or indication information of a DCI format to be detected by the terminals;

obtaining information of a group of terminals from the group common PDCCH;

wherein the information of the group of terminals is sent using the at least two DCI format through the group common PDCCH, wherein different types of information of the group of terminals are sent using the at least one downlink control information (DCI) format through the group common PDCCH, and wherein the information of the group of terminals at least comprises:

a slot format indication;

the slot format indication is sent using a first DCI format, and information other than the slot format indication is sent using at least one DCI format other than the first DCI format.

* * * * *